United States Patent
Maaref et al.

(10) Patent No.: US 10,873,941 B2
(45) Date of Patent: Dec. 22, 2020

(54) SYSTEM AND METHOD FOR JOINT TRANSMISSION OVER LICENSED AND UNLICENSED BANDS USING FOUNTAIN CODES

(71) Applicant: Huawei Technologies Co., Ltd., Shenzhen (CN)

(72) Inventors: Amine Maaref, Kanata (CA); Jianglei Ma, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/662,017

(22) Filed: Mar. 18, 2015

(65) Prior Publication Data
US 2015/0334712 A1     Nov. 19, 2015

Related U.S. Application Data

(60) Provisional application No. 61/994,592, filed on May 16, 2014.

(51) Int. Cl.
*H04W 72/04* (2009.01)
*H04W 88/06* (2009.01)
(Continued)

(52) U.S. Cl.
CPC ....... *H04W 72/0453* (2013.01); *H04L 1/0002* (2013.01); *H04L 1/004* (2013.01);
(Continued)

(58) Field of Classification Search
None
See application file for complete search history.

(56) References Cited

U.S. PATENT DOCUMENTS 7,512,094 B1   3/2009   Linebarger et al.
7,590,093 B1   9/2009   Goyal et al.
(Continued)

FOREIGN PATENT DOCUMENTS

CN   101268707 A   9/2008
CN   101345679 A   1/2009
(Continued)

OTHER PUBLICATIONS

International Search Report and Written Opinion received in International Application No. PCT/CN2015/079076 dated Aug. 19, 2015, 11 pages.
(Continued)

*Primary Examiner* — Gregory B Sefcheck
*Assistant Examiner* — Suk Jin Kang
(74) *Attorney, Agent, or Firm* — Slater Matsil, LLP (57) ABSTRACT

Transporting different sets of encoded packets generated from the same traffic flow over the respective licensed and unlicensed bands may provide bandwidth utilization efficiencies in addition to enabling more robust data streaming. More specifically, a transmit point may encode a traffic flow using a fountain code to obtain encoded packets, and then transmit different subsets of the encoded packets over the respective licensed and unlicensed bands. The fountain code may be applied at the physical layer, the media access control (MAC) layer, the radio link control (RLC) layer, or the application layer. The respective subsets of packets may be transmitted over the licensed and unlicensed bands at different rates. Different coding rates may be used over the respective bands.

22 Claims, 6 Drawing Sheets

(51) Int. Cl.
  *H04W 48/18* (2009.01)
  *H04W 28/22* (2009.01)
  *H04L 1/18* (2006.01)
  *H04L 1/04* (2006.01)
  *H04L 1/00* (2006.01)

(52) U.S. Cl.
  CPC .......... *H04L 1/0009* (2013.01); *H04L 1/0057* (2013.01); *H04L 1/04* (2013.01); *H04L 1/1819* (2013.01); *H04W 28/22* (2013.01); *H04W 48/18* (2013.01); *H04W 88/06* (2013.01); *Y02D 30/50* (2020.08)

(56) References Cited

U.S. PATENT DOCUMENTS

| | | | |
|---|---|---|---|
| 8,126,473 | B1 | 2/2012 | Kim et al. |
| 8,428,038 | B1 | 4/2013 | Buttles |
| 9,264,846 | B2 | 2/2016 | Stromberg et al. |
| 2003/0086515 | A1 | 5/2003 | Trans et al. |
| 2004/0203815 | A1 | 10/2004 | Shoemake et al. |
| 2006/0056365 | A1 | 3/2006 | Das et al. |
| 2006/0251026 | A1* | 11/2006 | Kalhan ............ H04L 1/004 370/335 |
| 2006/0281404 | A1 | 12/2006 | Lee et al. |
| 2007/0014536 | A1 | 1/2007 | Hellman |
| 2007/0026868 | A1 | 2/2007 | Schulz et al. |
| 2007/0099641 | A1 | 5/2007 | Lastinger et al. |
| 2007/0133482 | A1 | 6/2007 | Grannan |
| 2007/0275657 | A1 | 11/2007 | Chang et al. |
| 2008/0039089 | A1 | 2/2008 | Berkman et al. |
| 2008/0069242 | A1* | 3/2008 | Xu ............ H04N 19/89 375/240.24 |
| 2008/0107095 | A1 | 5/2008 | Black et al. |
| 2008/0161035 | A1 | 7/2008 | Tomioka et al. |
| 2008/0176518 | A1 | 7/2008 | Pascht et al. |
| 2008/0298275 | A1 | 12/2008 | De Sousa |
| 2009/0016246 | A1 | 1/2009 | Battin et al. |
| 2009/0109921 | A1* | 4/2009 | Bowen ............ H04W 36/24 370/331 |
| 2009/0175214 | A1 | 7/2009 | Sfar et al. |
| 2009/0258607 | A1* | 10/2009 | Beninghaus ........ H04B 1/3805 455/77 |
| 2009/0282309 | A1 | 11/2009 | Yue et al. |
| 2010/0227606 | A1 | 9/2010 | Nan et al. |
| 2010/0260266 | A1* | 10/2010 | Gholmieh ............ H04L 1/005 375/240.25 |
| 2011/0028102 | A1* | 2/2011 | Li ............ H04W 74/0816 455/71 |
| 2011/0115976 | A1 | 5/2011 | Ohayon et al. |
| 2011/0158096 | A1* | 6/2011 | Leung ............ H04L 1/0079 370/232 |
| 2011/0165896 | A1 | 7/2011 | Stromberg et al. |
| 2011/0176478 | A1 | 7/2011 | Inohiza |
| 2011/0206054 | A1 | 8/2011 | Pajjuri et al. |
| 2011/0243060 | A1 | 10/2011 | Mildh et al. |
| 2011/0286343 | A1* | 11/2011 | Powell ............ H04W 76/10 370/252 |
| 2011/0286424 | A1 | 11/2011 | Jeon et al. |
| 2011/0305189 | A1 | 12/2011 | Chen et al. |
| 2012/0039284 | A1* | 2/2012 | Barbieri ............ H04W 48/10 370/329 |
| 2012/0077510 | A1 | 3/2012 | Chen et al. |
| 2012/0250631 | A1 | 10/2012 | Hakola et al. |
| 2012/0317300 | A1 | 12/2012 | Huang et al. |
| 2013/0016221 | A1 | 1/2013 | Charbit et al. |
| 2013/0023202 | A1 | 1/2013 | Koskela et al. |
| 2013/0059594 | A1* | 3/2013 | Hui ............ H04W 88/06 455/452.1 |
| 2013/0064198 | A1 | 3/2013 | Krishnaswamy et al. |
| 2013/0077501 | A1 | 3/2013 | Krishnaswamy et al. |
| 2013/0143541 | A1 | 6/2013 | Henderson et al. |
| 2013/0155991 | A1 | 6/2013 | Kazmi et al. |
| 2013/0156005 | A1 | 6/2013 | Li et al. |
| 2013/0165134 | A1 | 6/2013 | Touag et al. |
| 2013/0255991 | A1 | 6/2013 | Snitchler et al. |
| 2013/0176934 | A1 | 7/2013 | Malladi et al. |
| 2013/0188552 | A1 | 7/2013 | Kazmi et al. |
| 2013/0242873 | A1 | 9/2013 | Ohayon et al. |
| 2013/0244666 | A1 | 9/2013 | Carmon et al. |
| 2013/0276044 | A1 | 10/2013 | Ohayon et al. |
| 2013/0286834 | A1 | 10/2013 | Lee |
| 2013/0295946 | A1 | 11/2013 | Panchal et al. |
| 2013/0295948 | A1 | 11/2013 | Ye et al. |
| 2013/0311673 | A1 | 11/2013 | Karthikeyan et al. |
| 2013/0337821 | A1 | 12/2013 | Clegg |
| 2013/0343288 | A1 | 12/2013 | Ratasuk et al. |
| 2014/0016570 | A1 | 1/2014 | Ma et al. |
| 2014/0016620 | A1 | 1/2014 | Singh et al. |
| 2014/0023022 | A1 | 1/2014 | Cheng et al. |
| 2014/0031054 | A1 | 1/2014 | Zou et al. |
| 2014/0092828 | A1 | 4/2014 | Sirotkin |
| 2014/0120975 | A1 | 5/2014 | Liu et al. |
| 2014/0169261 | A1* | 6/2014 | Ming ............ H04W 88/04 370/315 |
| 2014/0189091 | A1 | 7/2014 | Tamasi et al. |
| 2014/0233437 | A1 | 8/2014 | Abdoli et al. |
| 2014/0233472 | A1 | 8/2014 | Kadel |
| 2014/0269550 | A1* | 9/2014 | Webb ............ H04W 72/0446 370/329 |
| 2014/0282754 | A1 | 9/2014 | Rehman et al. |
| 2014/0287769 | A1 | 9/2014 | Taori et al. |
| 2014/0294118 | A1* | 10/2014 | Baik ............ H03M 13/3761 375/296 |
| 2014/0307552 | A1* | 10/2014 | Elsherif ............ H04W 36/14 370/235 |
| 2015/0009869 | A1* | 1/2015 | Clegg ............ H04W 72/042 370/278 |
| 2015/0009962 | A1* | 1/2015 | Clegg ............ H04W 24/08 370/331 |
| 2015/0011226 | A1* | 1/2015 | De Sousa ............ H04W 24/02 455/446 |
| 2015/0023315 | A1 | 1/2015 | Yerramalli et al. |
| 2015/0049712 | A1 | 2/2015 | Chen et al. |
| 2015/0049741 | A1 | 2/2015 | Chen et al. |
| 2015/0067451 | A1* | 3/2015 | Karande ............ H04L 1/0057 714/776 |
| 2015/0085741 | A1* | 3/2015 | Sfar ............ H04B 7/15592 370/315 |
| 2015/0117468 | A1* | 4/2015 | Shin ............ H04L 5/0055 370/474 |
| 2015/0131536 | A1* | 5/2015 | Kaur ............ H04L 5/001 370/329 |
| 2015/0146615 | A1* | 5/2015 | Yu ............ H04L 5/0073 370/328 |
| 2015/0172931 | A1 | 6/2015 | Jose et al. |
| 2015/0188665 | A1* | 7/2015 | Chen ............ H04L 1/0045 375/316 |
| 2015/0189652 | A1 | 7/2015 | Mizusawa |
| 2015/0215133 | A1* | 7/2015 | Cao ............ H04L 65/607 370/312 |
| 2015/0237628 | A1* | 8/2015 | Nerella ............ H04W 52/52 370/329 |
| 2015/0264702 | A1* | 9/2015 | Yang ............ H04W 72/0453 455/452.1 |
| 2015/0289270 | A1 | 10/2015 | Knapp et al. |
| 2015/0304146 | A1 | 10/2015 | Yang et al. |
| 2015/0319753 | A1* | 11/2015 | Chen ............ G01N 33/57446 370/277 |
| 2016/0112157 | A1* | 4/2016 | Li ............ H04L 1/0061 714/807 |
| 2016/0135143 | A1* | 5/2016 | Won ............ H04W 72/005 370/312 |
| 2016/0285537 | A1 | 9/2016 | Maaref et al. |
| 2016/0295477 | A1 | 10/2016 | Zhu |

(56) References Cited

U.S. PATENT DOCUMENTS

2017/0118758 A1  4/2017  Li
2018/0199280 A1*  7/2018  Griot .................. H04W 8/18

FOREIGN PATENT DOCUMENTS

| | | |
|---|---|---|
| CN | 101682530 A | 3/2010 |
| CN | 101743766 A | 6/2010 |
| CN | 101820632 A | 9/2010 |
| CN | 102232307 A | 11/2011 |
| CN | 102474727 A | 5/2012 |
| CN | 102907153 | 1/2013 |
| CN | 103327552 A | 9/2013 |
| CN | 103414917 A | 11/2013 |
| CN | 103441779 A | 12/2013 |
| CN | 103532663 A | 1/2014 |
| CN | 103583028 A | 2/2014 |
| CN | 104041174 A | 9/2014 |
| EP | 1545144 A1 | 6/2005 |
| JP | 2010505324 A | 2/2010 |
| KR | 20090082366 A | 7/2009 |
| KR | 20130126816 | 11/2013 |
| RU | 2419997 C2 | 5/2011 |
| WO | 0064106 A1 | 10/2000 |
| WO | 2010077631 A1 | 7/2010 |
| WO | 2012039656 A1 | 3/2012 |
| WO | 2012078565 A1 | 6/2012 |
| WO | 2012144801 A2 | 10/2012 |
| WO | 2012171931 A1 | 12/2012 |
| WO | 2013103754 | 7/2013 |
| WO | 2013103754 A1 | 7/2013 |
| WO | 2013162615 A1 | 10/2013 |
| WO | 2014027496 | 2/2014 |

OTHER PUBLICATIONS

International Search Report and Written Opinion received in International Application No. PCT/CN2015/078962 dated Aug. 20, 2015, 11 pages.
International Search Report and Written Opinion received in International Application No. PCT/CN2015/077813 dated May 16, 2014, 10 pages.
LTE, 3rd Generation Partnership Project; Technical Specification Group Services and System Aspects; Multimedia Broadcast/Multicase Service (MBMS); Protocols and Codecs (Release 13), 3GPP TS 26.346 v13.0.0, Mar. 2015, 207 pages.
Byers, J.W., et al., "A Digital Fountain Approach to Reliable Distribution of Bulk Data," (date unknown), 15 pages.
Kushwaha, H., et al., "Reliable Multimedia Transmission Over Cognitive Radio Networks Using Fountain Codes," Proceedings of the IEEE, vol. 96, No. 1, Jan. 2008, 11 pages.
Luby, Michael G., et al., "Efficient Erasure Correcting Codes," IEEE Transactions of Information Theory, vol. 47, No. 2, Feb. 2001, pp. 569-584.
Luby, Michael, "LT Codes," Proceedings of the 43rd Annual IEEE Symposium on Foundations of Computer Science (FOCS '02), 2002, 10 pages.
Shokrollahi, Amin, "Raptor Codes," IEEE Transactions of Information Theory, vol. 52, No. 6, Jun. 2006, pp. 2551-2567.
"New SID: Study on Licensed-Assisted Access using LTE," 3GPP TSG RAN Meeting #63, RP-140481, Fukuoka, Japan, Mar. 3-6, 2014, 8 pages.
Ericsson et al., "Study on Licensed-Assisted Access Using LTE Motivation," 3GPP TSG RAN Meeting #63, RP-140260, Mar. 2014, 8 pages, Fukuoka, Japan.
Huawei et al., "Motivation of the New SI Proposal: Study on Licensed-Assisted Access using LTE," 3GPP TSG RAN Meeting #63, RP-140214, Mar. 2014, 9 pages, Fukuoka, Japan.

\* cited by examiner

FIG. 11

SYSTEM AND METHOD FOR JOINT TRANSMISSION OVER LICENSED AND UNLICENSED BANDS USING FOUNTAIN CODES

This patent application claims priority to U.S. Provisional Application No. 61/994,592, filed on May 16, 2016 and entitled "System and Method for Joint Transmission over Licensed and Unlicensed Spectrum Bands using Fountain Codes," which is hereby incorporated by reference herein as if reproduced in its entirety.

TECHNICAL FIELD

The present invention relates to a system and method for wireless communications, and, in particular embodiments, to a system and method for joint transmission over licensed and unlicensed bands using fountain codes.

BACKGROUND

Governmental bodies reserve bands of the wireless spectrum for different uses. For example, the Federal Communications Commission (FCC), the International Telecommunication Union (ITU), and other regulatory agencies reserve some portions of the spectrum for licensed activities (e.g., radio, television, satellite, mobile telecommunication), while reserving other portions of the spectrum for unlicensed activities. The licensed spectrums are subject to regulations set forth by the regulatory agency, as well as to operating protocols agreed upon by the public and/or private entities engaging in the licensed activity. The spectrum reserved for unlicensed communications may also be subject to regulations set forth by the corresponding regulatory agency, particularly with regards to transmission power and shared access. Notably, data rates and quality of service (QoS) metrics (e.g., packet loss rates) of transmissions over the unlicensed spectrum may fluctuate considerably due to contention and interference from other unlicensed users/sources, e.g. users broadcasting large amounts of data at high transmit power levels.

SUMMARY

Technical advantages are generally achieved, by embodiments of this disclosure which describe a system and method for joint transmission over licensed and unlicensed bands using fountain codes.

In accordance with an embodiment, a method for wireless transmission is provided. In this example, the method includes encoding a traffic flow using a fountain code to obtain encoded packets, and transmitting a first subset of the encoded packets over a licensed band, and a second subset of the encoded packets over an unlicensed band. An apparatus for performing this method is also provided.

In accordance with another embodiment, a method for receiving wireless transmissions is provided. In this example, the method includes receiving a wireless transmission carrying a first subset of encoded packets over a licensed band, and a second subset of encoded packets over a unlicensed band, the wireless transmission being received from a transmit point, and decoding both the first subset of encoded packets and the second subset of encoded packets in accordance with the same fountain code to obtain a traffic flow. An apparatus for performing this method is also provided.

BRIEF DESCRIPTION OF THE DRAWINGS

For a more complete understanding of the present invention, and the advantages thereof, reference is now made to the following descriptions taken in conjunction with the accompanying drawing, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The structure, manufacture and use of the presently disclosed embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Many conventional wireless telecommunication protocols, such as the long term evolution (LTE) advanced (LTE-A) protocol, operate exclusively in frequency bands licensed for wireless communications, which are collectively referred to as the "licensed band" throughout this disclosure. Other conventional wireless telecommunications protocols, such as the Wi-Fi protocol, operate exclusively in the band reserved for unlicensed communication, which is referred to as the "unlicensed band" throughout this disclosure. The term "licensed band" may be used interchangeably with the term "primary band," and the term "unlicensed band" may be used interchangeably with the term "complementary band." Notably, the frequency bands licensed for wireless transmission may change from time to time, and the term "licensed band" includes frequency bands that are re-licensed for wireless transmission after the filing of this application. Telecommunication protocols operating over the licensed band often provide more reliable data transmissions, while telecommunication protocols operating over the unlicensed band are often capable of supporting low latency high volume transmissions, albeit with reduced reliability.

A unified air interface that transports wireless transmissions spanning portions of both the licensed and unlicensed bands is described in U.S. patent application Ser. No. 14/669,333. Aspects of this disclosure extend that concept to transporting different sets of encoded packets over the respective licensed and unlicensed bands. A transmit point may encode a traffic flow using a fountain code to obtain encoded packets, and then transmit different subsets of the encoded packets over the respective licensed and unlicensed bands. The fountain code may be applied at the physical layer, the media access control (MAC) layer, the radio link control (RLC) layer, or the application layer. In some embodiments, the respective subsets of packets are transmitted over the licensed and unlicensed bands at different rates. In one example, the transmission rates for the respective bands are determined in accordance with a QoS constraint of the traffic flow, as well as conditions of the respective bands. The transmission rates may be dynamically adjusted based on a measured QoS metric of the traffic flow, a condition of the unlicensed band, or a condition of the licensed band. In some embodiments, the rates over the respective licensed and unlicensed bands are adjusted by inversely proportional amounts. In one example, the rate over the licensed band is increased by an amount that is proportional to an amount in which the rate over the unlicensed band is decreased. In some embodiments, the transmitter uses different coding rates over the respective bands. In one example, the coding rate over the unlicensed band is higher than the licensed band to compensate for the lower reliability of the unlicensed band. Fountain codes may be rate-less codes. These and other details are discussed in greater detail below.

As used herein, the term "unified air interface" refers to an air interface sharing a common physical and medium access control (MAC) connection, as may be consistent with an interface operating in accordance with a common radio access technology (RAT), such as a wireless radio access network (RAN) in a fifth generation (5G) LTE system. In some embodiments, a unified air interface includes at least two spectrum-type dependent air interface configurations, including one air interface configuration for a licensed band, and one air interface configuration for a unlicensed band.

Figure 1:
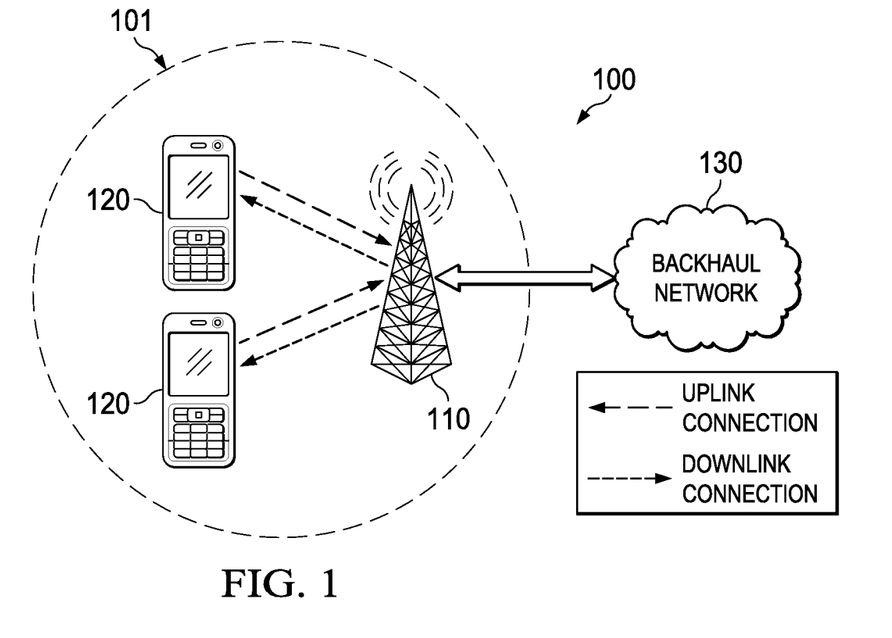
FIG. 1 illustrates a diagram of an embodiment wireless communications network.

FIG. 1 illustrates a network 100 for communicating data. The network 100 comprises a base station 110 having a coverage area 101, a plurality of mobile devices 120, and a backhaul network 130. As shown, the base station 110 establishes uplink (dashed line) and/or downlink (dotted line) connections with the mobile devices 120, which serve to carry data from the mobile devices 120 to the base station 110 and vice-versa. Data carried over the uplink/downlink connections may include data communicated between the mobile devices 120, as well as data communicated to/from a remote-end (not shown) by way of the backhaul network 130. As used herein, the term "base station" refers to any component (or collection of components) configured to provide wireless access to a network, for example a base station such as an evolved Node B (eNB) as defined by the 3rd Generation Partnership Project (3GPP), a macro-cell, a femtocell, a Wi-Fi access point (AP), or other wirelessly enabled devices. Base stations provide wireless access in accordance with one or more wireless communication protocols, e.g., long term evolution (LTE), LTE advanced (LTE-A), High Speed Packet Access (HSPA), Wi-Fi 802.11a/b/g/n/ac. As used herein, the term "mobile device" refers to any component (or collection of components) capable of establishing a wireless connection with a base station, such as a user equipment (UE), a mobile station (STA), and other wirelessly enabled devices that may or may not be mobile. In some embodiments, the network 100 includes various other wireless devices, such as relays, low power nodes.

Figure 2:
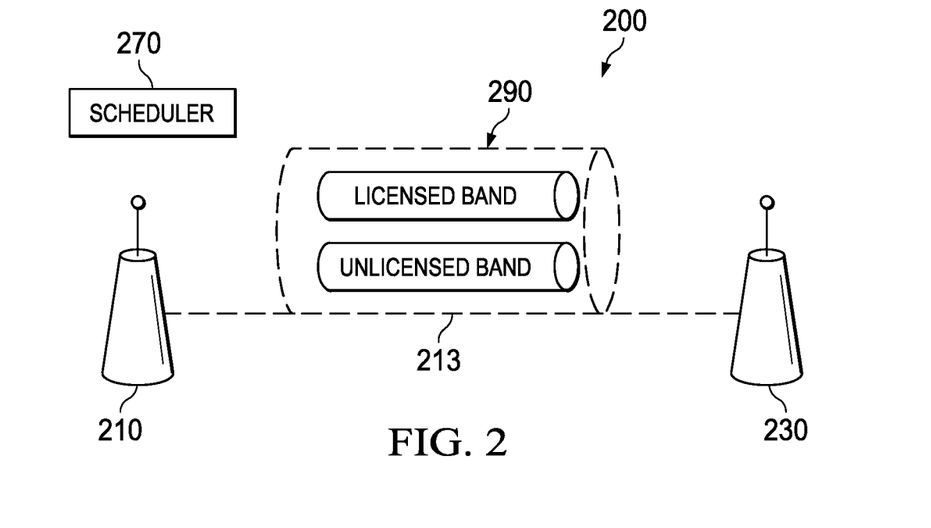
FIG. 2 illustrates a diagram of an embodiment wireless network adapted to transport wireless transmissions spanning portions of both the licensed and unlicensed spectrums over a unified air interface.

As discussed in U.S. patent application Ser. No. 14/669,333, a unified air interface that supports wireless transmissions spanning portions of both the licensed and unlicensed spectrums can be established between a transmit point and a receive point. FIG. 2 illustrates an embodiment wireless network 200 adapted for communicating wireless transmissions spanning portions of both the licensed and unlicensed spectrums. As shown, the wireless network 200 includes a transmit point 210, a receive point 230, and a scheduler 270. The transmit point 210 may be any device adapted to emit a wireless transmission, and the receive point 230 may be any device adapted to receive the wireless transmission from the transmit point 210. For example, the transmit point 210 may be a base station, a relay station, or a mobile station. Likewise, receive point 230 may also be a base station, a relay station, or a mobile station.

A unified air interface 213 established between the transmit point 210 and the receive point 230 is adapted to carry a wireless transmission 290 that spans at least a portion of the licensed band and a portion of the unlicensed band. The wireless transmission 290 may be any type of wireless signal communicated between the transmit point 210 and the receive point 230, e.g., a downlink signal, an uplink signal, a device-to-device signal, or a signal communicated over a wireless backhaul link (e.g., between neighboring base stations). The wireless transmission 290 may have different transmission formats/characteristics in different implementations. For example, the wireless transmission 290 may be a unicast transmission, a multi-cast transmission, or a broadcast transmission. In other examples, the wireless transmission may include single-layer signaling and/or multi-layer signaling communicated from a single antenna or from multiple antennas, e.g., single-user (SU) multiple input multiple output (MIMO) transmissions, multi-user MIMO transmissions.

The scheduler 270 may be a control plane entity adapted to schedule traffic over the unified air interface 213. In some embodiments, the scheduler 270 is an integrated component on the transmit point 210. For instance, the transmit point 210 may be a base station, and the scheduler 270 may be an on-board component of the base station adapted to schedule downlink transmissions. In other embodiments, the scheduler 270 is an integrated component on the receive point 230. For instance, the receive point 230 may be a base station, and the scheduler 270 may be an on-board component of the base station adapted to schedule uplink transmissions from the transmit point 210. In yet other embodiments, the scheduler 270 is independent from the transmit point 210 and the receive point 210. In one example, the scheduler 270 is a centralized controller adapted to perform scheduling for a cluster of base stations. In another example, at least one of the transmit point 210 and the receive point 230 is a low power node, and the scheduler 270 is an on-board component of a macro-base station that performs scheduling for the low power node. In yet another example, the transmit point 210 and the receive point 230 are mobile devices or machines, and the scheduler 270 is an on-board component of a base station that perform scheduling for device-to-device (D2D) or machine-to-machine (M2M)

transmissions between the transmit point 210 and the receive point 230. Other implementations are also possible.

The scheduler 270 may provide a traffic engineering (TE) policy to the transmit point 210 that specifies encoding parameters for the licensed and unlicensed bands. In one embodiment, the TE policy dictates that a traffic flow is encoded using one or more fountain codes to obtain encoded packets, and that the encoded packets are multiplexed over the licensed and unlicensed bands in a manner that satisfies one or more criteria or objectives. The TE policy may dictate parameters of the fountain code(s) (e.g., coding rate), and parameters for multiplexing the encoded packets over the licensed and unlicensed bands.

In other embodiments, the TE policy dictates that encoded packets are multiplexed over the licensed and unlicensed bands in a manner that maintains a specified throughput for the traffic flow, while optimizing or improving bandwidth utilization. For instance, the transmission rate over the unlicensed band may be adjusted based on a contention level of the unlicensed band, and the transmission rate over the licensed band may be adjusted to maintain the overall transmission rate at specific threshold.

In yet other example embodiments, the encoded packets are multiplexed in a manner that satisfies a statistical QoS constraint of the traffic flow. As referred to herein, a "statistical QoS constraint" is a QoS constraint that can be satisfied even when some packets (e.g., a fraction of the total packets) are communicated in a manner that violates a QoS requirement. For example, if a traffic flow has a statistical latency requirement, then the service agreement may be satisfied so long as a certain percentage of the packets are communicated within a delay bound. Statistical QoS constraints differ from "deterministic QoS constraints," which require that every packet in a traffic flow is communicated in a manner that satisfies a QoS requirement.

To satisfy the statistical QoS constraint, a transmission rate at which the encoded packets are transmitted over one or both bands may be dynamically varied based on a measured QoS metric of the traffic flow, e.g., packet loss rate, latency/packet-delay. In one embodiment, the transmission rate over the licensed band is ramped up or down to adjust a measured packet loss or packet delay.

Figure 3:
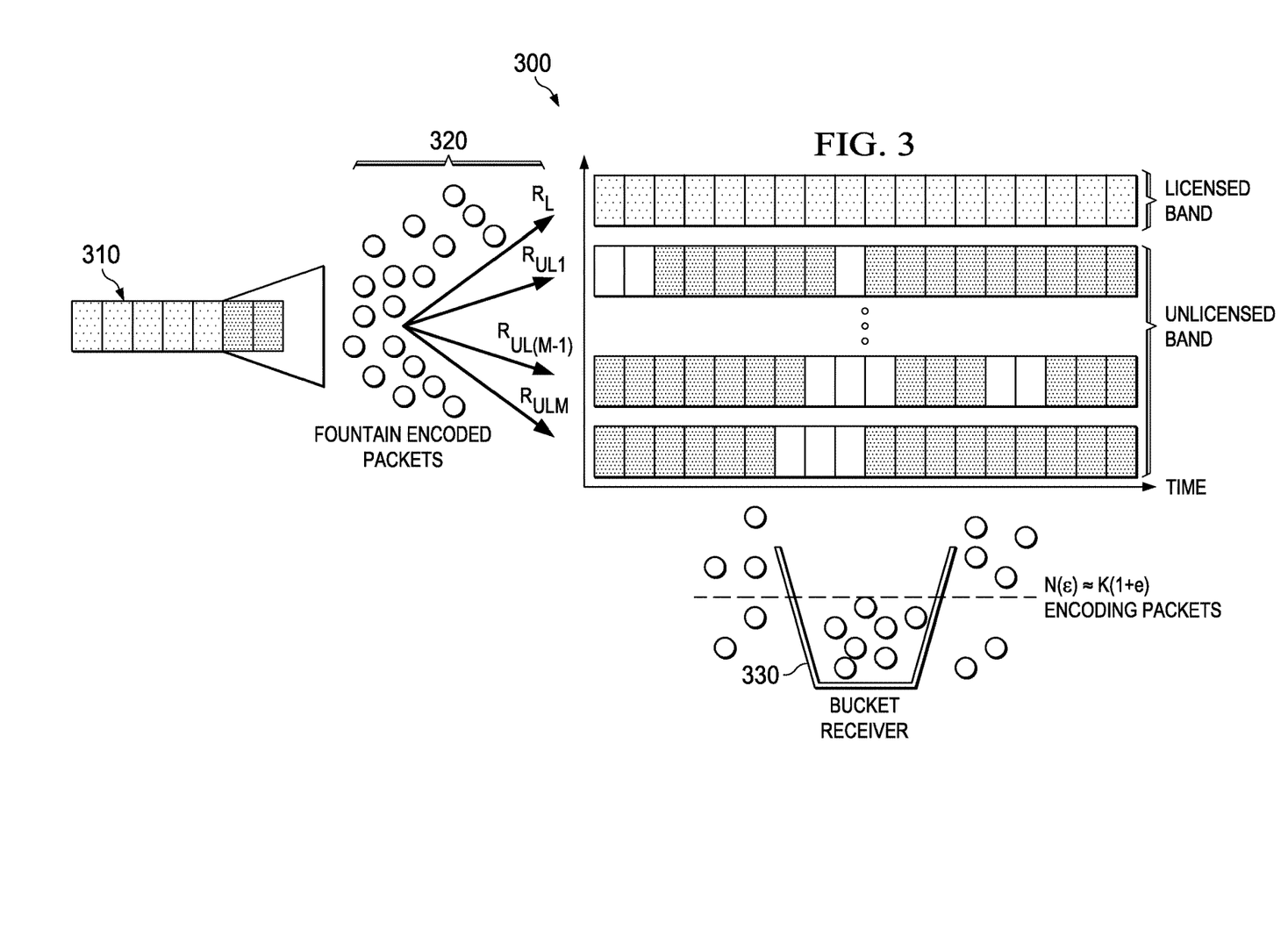
FIG. 3 illustrates a diagram for utilizing fountain codes over licensed and unlicensed spectrums.

Aspects of this disclosure provide techniques for applying a fountain code to a traffic flow, and multiplexing the resulting encoded packets over the licensed and unlicensed bands. FIG. 3 illustrates a system 300 for utilizing fountain codes over licensed and unlicensed spectrums. As shown, a traffic flow 310 is encoded using a fountain code to produce a plurality of encoded packets 320. The encoded packets 320 are then multiplexed over the licensed band and unlicensed band, and received by the receiver 330. The receiver 330 may be able to decode the traffic flow 310 upon receiving and/or successfully decoding a threshold number of encoding packets 320.

As shown, different subsets of the encoded packets are multiplexed over different portions of the licensed and unlicensed bands. The encoded packets 320 may be transmitted at different rates ($R_L$, $R_{UL1}$, ... $R_{UL(M-1)}$, $R_{ULM}$) over different portions of the licensed and unlicensed bands. A transmit point may dynamically vary the number of encoding packets assigned to portions of the bands depending on various criteria, e.g., load levels, packet loss levels, channel conditions, QoS requirements/metrics. The receiver 330 may be a bucket receiver, e.g., a receiver that can recover a data segment upon receiving a threshold level of fountain encoded symbols/packets. Original information (e.g., K input packets) are recovered with a probability of 1-ε as long as enough encoding packets $N(\varepsilon) \approx K(1+e)$ are received (irrespective of which packets are received) using message passing belief-propagation (BP) decoding.

Cross-spectrum fountain coding provides joint transmission over the licensed spectrum ($B_L$) and one or more unlicensed bands ($B_{UL1}$, ..., $B_{ULM}$). The transmission rate R can potentially be greater than the capacity of any one available channel, i.e. within the range: $\max(C(B_L), C(B_{UL1}), \ldots, C(B_{ULM})) \leq R \leq C(B_L + B_{UL1} + \ldots + B_{ULM})$, where C(B) denotes the channel capacity for a given spectrum band B. The fountain code provides diversity or multiplexing according to QoS requirements and channel quality across all spectrum bands.

In an embodiment, cross-spectrum channel coding uses rate-less fountain codes. An embodiment generates as many encoded packets as desired. The codes are suitable for erasure channels where channel fading is not identical (sub-channels are more or less reliable depending on the spectrum band). Therefore, there is no need to know coding rates a priori, and encoded packets can be generated on the fly as needed. Digital fountain codes are asymptotically optimal. An embodiment may utilize linear encoding and decoding complexity. An embodiment may utilize Raptor codes, which are computationally efficient pre-coded fountain codes and are systematic codes with linear encoding and decoding complexity.

Figure 4:
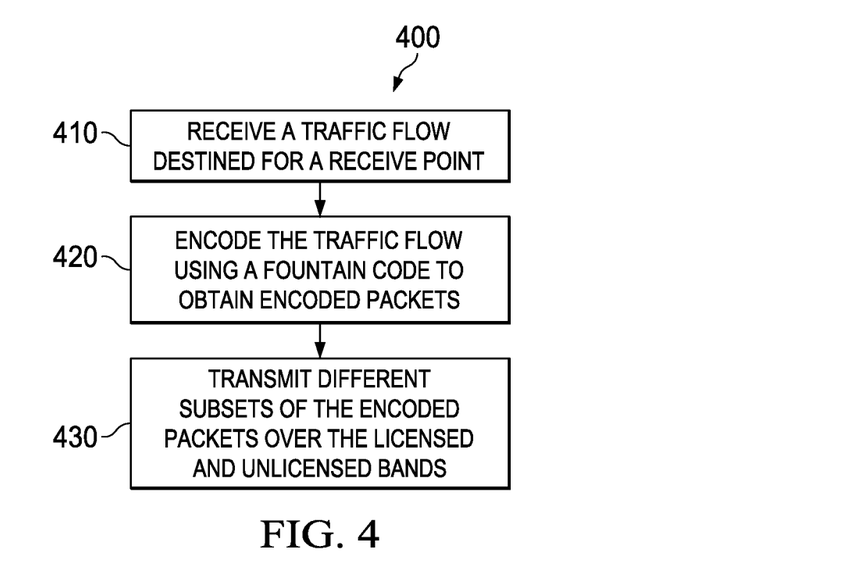
FIG. 4 illustrates a flowchart of an embodiment method for multiplexing encoded packets of a traffic flow over licensed and unlicensed spectrums.

FIG. 4 illustrates an embodiment method 400 for multiplexing encoded packets of a traffic flow over licensed and unlicensed spectrums, as might be performed by a transmit point. At step 410, the transmit point receives a traffic flow destined for a receive point. At step 420, the transmit point encodes the traffic flow using a fountain code to obtain encoded packets. Parameters of the fountain code may be defined by a TE policy. At step 430, the transmit point transmits different subsets of the encoded packets over the licensed and unlicensed bands. In some embodiments, the transmit point varies transmission rates over the respective licensed and unlicensed bands based on a monitored QoS metric of the traffic flow and/or monitored channel conditions over the licensed and/or unlicensed bands.

Figure 5:
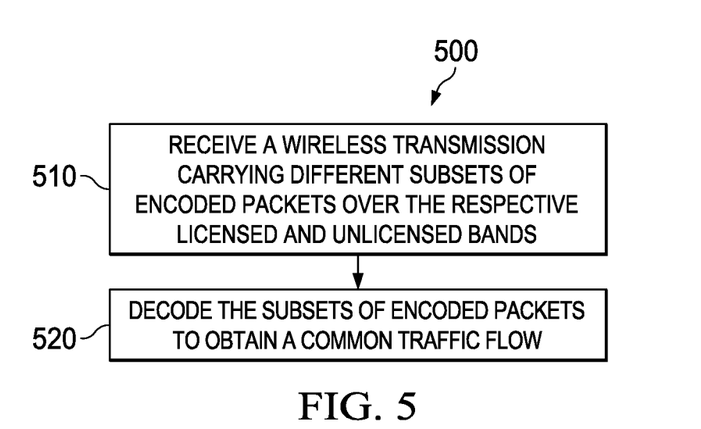
FIG. 5 illustrates a flowchart of an embodiment method for receiving encoded packets of a traffic flow over licensed and unlicensed spectrums.

FIG. 5 illustrates an embodiment method 500 for receiving encoded packets of a traffic flow over licensed and unlicensed spectrums, as might be performed by a receive point. At step 510, the receive point receives a wireless transmission carrying different subsets of encoded packets over the respective licensed and unlicensed bands. At step 520, the receive point decodes the subsets of encoded packets to obtain a common traffic flow.

An embodiment provides joint transmission in a wireless system using a unified 5G air interface over both licensed spectrum and unlicensed spectrum bands. An embodiment system and method provide joint transmission over both licensed and unlicensed spectrum bands using fountain codes to efficiently and jointly utilize both licensed and unlicensed spectrum in order to enhance the performance of 5G radio access networks.

Telecommunication protocols may include built-in automatic-repeat request (ARQ) re-transmission protocols. In one example, a Hybrid-ARQ (H-ARQ) protocol is adopted at the MAC layer such that a MAC layer packet is retransmitted up to a threshold number of times. The MAC layer packet is dropped when the receiver does not successfully acknowledge the packet after the maximum number of retransmissions is reached. In another example, an ARQ protocol is applied at the RLC layer in order to catch residual packet errors that are not captured by the H-ARQ protocol. MAC-layer H-ARQ and RLC layer ARQ protocols may complement each other, as the RLC layer ARQ protocol may provide high reliability at a reasonable energy cost, while the MAC-layer H-ARQ protocol provides low latency (e.g., fast) re-transmissions. Both MAC-layer H-ARQ and RLC layer ARQ protocols increase overhead in the channel, as well as require additional energy consumption at the transmit and receive points. In some embodiments, the MAC layer H-ARQ and/or RLC-layer ARQ are omitted to reduce overhead and/or energy consumption. In such embodiments, rate-less fountain codes may be adapted/designed to provide adequate reliability/performance in the proposed cross-band coding framework.

An embodiment applies fountain codes at the radio MAC layer. An embodiment applies fountain codes at the radio link control (RLC) layer. An embodiment applies fountain codes above the physical (PHY)/MAC layers in the radio access protocol stack. An embodiment provides flexible (application-specific) cross-spectrum coding. An embodiment is agnostic of 5G PHY/MAC designs used in licensed and unlicensed spectrum bands. An embodiment complements or replaces MAC-layer hybrid automatic repeat request (HARQ) and/or radio link control (RLC)-layer retransmission protocols. An embodiment dynamically adjusts transmission rates across licensed and unlicensed spectrum bands to achieve application-specific QoS and maximize overall system performance.

Joint transmission over licensed and unlicensed spectrum bands is an enabler for, e.g., the 1000-fold capacity increase expected in 5G radio access networks. An embodiment is suitable for the massive capacity projected in 5G radio access networks where efficient utilization of licensed and unlicensed spectrum resources will play a major role.

Figure 6:
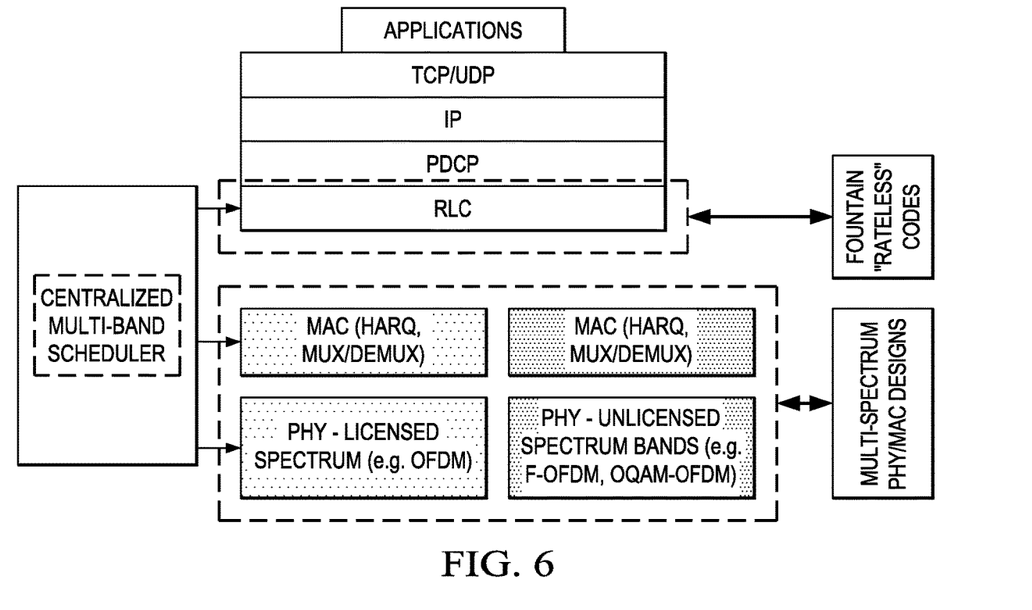
FIG. 6 illustrates a diagram of an embodiment fountain coding technique performed at the radio link control (RLC) layer.

FIG. 6 illustrates fountain codes implemented at the radio link control (RLC) layer. The fountain codes can be implemented at any layer of the protocol stack, including the media access control (MAC) layer, the RLC layer, and the application layer. The layer in which the fountain codes are implemented may depend on performance requirements, application requirements (e.g., end-to-end delay), and transmission power costs.

Fountain encoding is completely agnostic to possibly different MAC and physical (PHY) designs used in the licensed and unlicensed spectrum bands. Applying fountain codes in the RLC layer can replace MAC layer HARQ retransmissions, thus saving signaling overhead and increasing energy efficiency.

Figure 7:
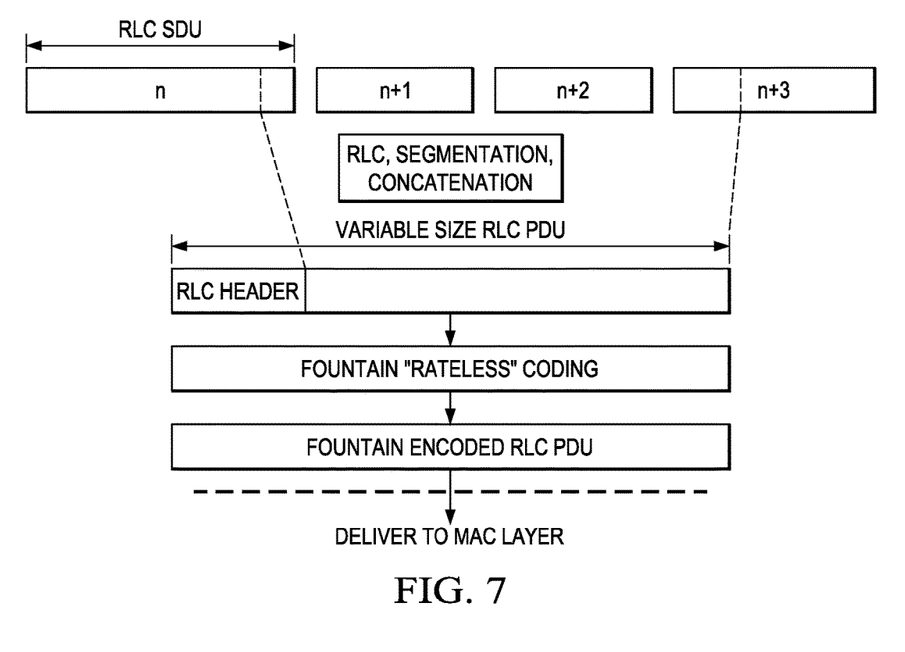
FIG. 7 illustrates a diagram of an embodiment technique for implementing fountain coding at the RLC layer.

FIG. 7 illustrates a diagram of an embodiment technique for implementing fountain encoding at the RLC layer. In this example, the fountain code is applied on buffered RLC service data units (SDUs) before RLC segmentation and concatenation stage.

Figure 8:
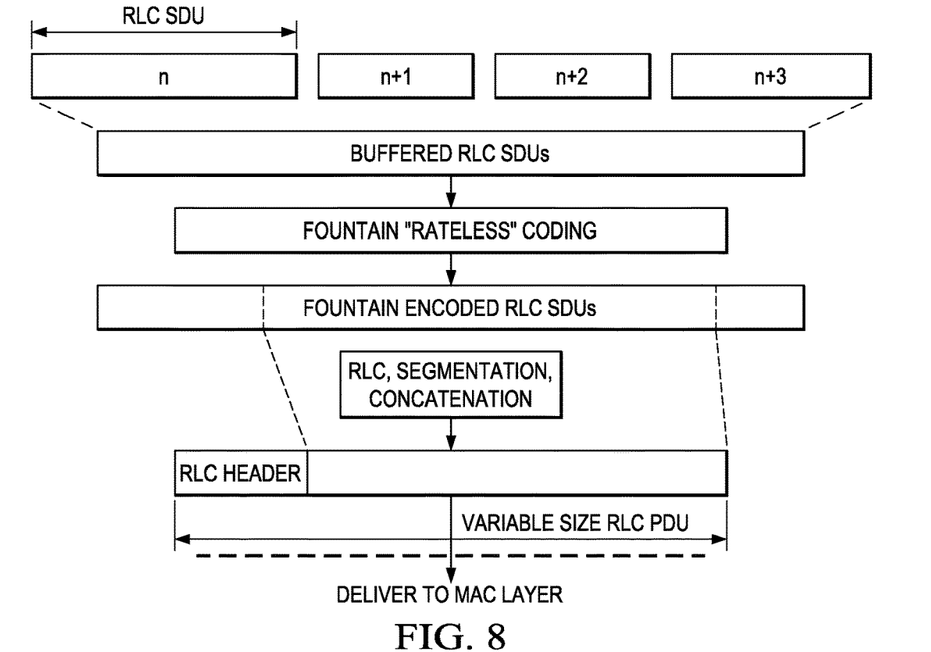
FIG. 8 illustrates a diagram of another embodiment technique for implementing fountain coding at the RLC layer.

FIG. 8 illustrates a diagram of another embodiment technique for implementing fountain encoding at the RLC layer. In this example, the fountain code is applied on single RLC packet data units (PDUs) after RLC segmentation and concatenation stage.

Figure 9:
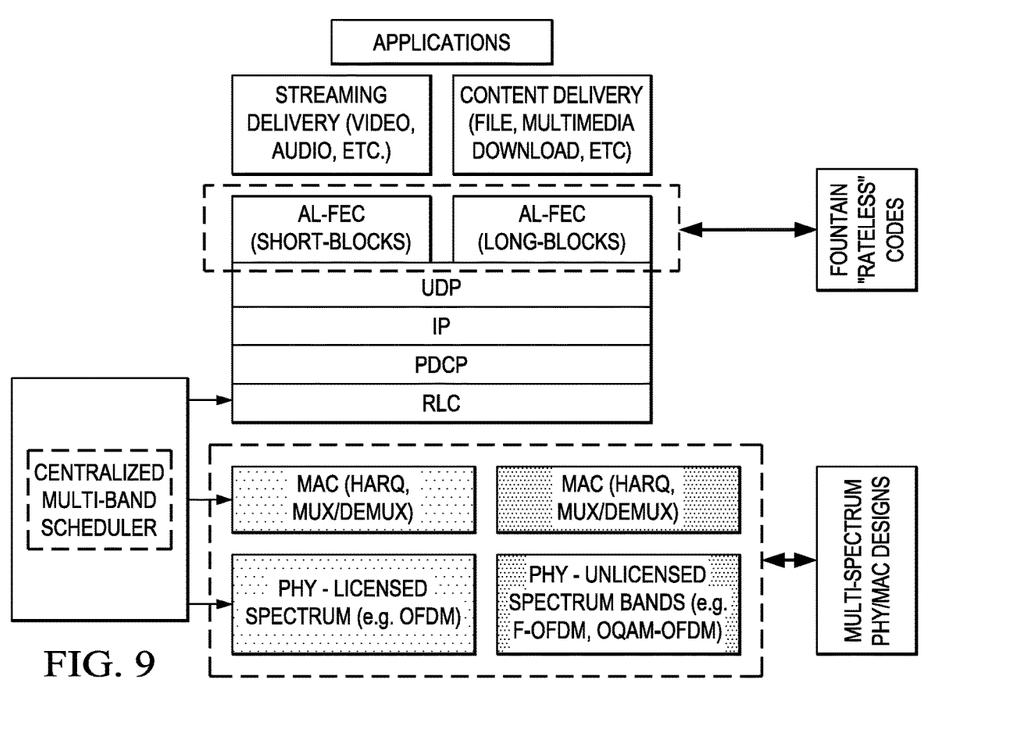
FIG. 9 illustrates a diagram of an embodiment fountain coding technique performed at the application layer.

FIG. 8 illustrates a diagram of another embodiment technique for implementing fountain encoding at the application layer. The fountain code can be application-specific such that different fountain codes are used for different applications. A receiver may perform fountain encoding on a single block when the receiver has enough memory. Otherwise, data may be partitioned into a set of sub-blocks prior to encoding.

Embodiment fountain encoding techniques may be agnostic to PHY/MAC layer designs in licensed and unlicensed spectrum bands. The licensed spectrum and the unlicensed spectrum may utilize different PHY designs, e.g., different waveforms, different access schemes, different frame structure, different channelization.

In embodiments employing cross-spectrum rate adjustment, some delay-sensitive multimedia applications may be subject to maximum delay constraints ($D_{max}$), e.g., a certain number of encoding packets have to be received within a certain delay $D_{max}$. A central controller (CC) entity may monitor load levels, interference, and channel conditions, as well as estimate long-term statistical packet loss rates over unlicensed spectrum bands. The controller may also adjust transmission rates over licensed and unlicensed spectrum bands in order to meet the QoS constraints. For example, the controller may increase a transmission rate over the unlicensed spectrum and reduce the transmission rate over the licensed spectrum to meet a delay constraint.

Figure 10:
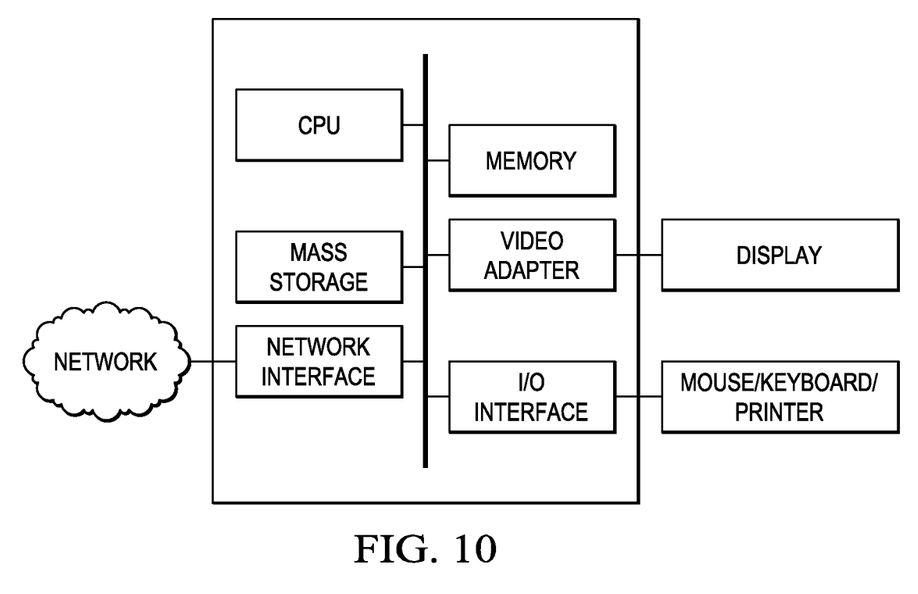
FIG. 10 illustrates a diagram of an embodiment computing platform.

FIG. 10 illustrates a block diagram of a processing system that may be used for implementing the devices and methods disclosed herein. Specific devices may utilize all of the components shown, or only a subset of the components, and levels of integration may vary from device to device. Furthermore, a device may contain multiple instances of a component, such as multiple processing units, processors, memories, transmitters, receivers. The processing system may include a processing unit equipped with one or more input/output devices, such as a speaker, microphone, mouse, touchscreen, keypad, keyboard, printer, display, and the like. The processing unit may include a central processing unit (CPU), memory, a mass storage device, a video adapter, and an I/O interface connected to a bus.

The bus may be one or more of any type of several bus architectures including a memory bus or memory controller, a peripheral bus, video bus, or the like. The CPU may include any type of electronic data processor. The memory may include any type of system memory such as static random access memory (SRAM), dynamic random access memory (DRAM), synchronous DRAM (SDRAM), read-only memory (ROM), a combination thereof, or the like. In an embodiment, the memory may include ROM for use at boot-up, and DRAM for program and data storage for use while executing programs.

The mass storage device may include any type of storage device configured to store data, programs, and other information and to make the data, programs, and other information accessible via the bus. The mass storage device may include, for example, one or more of a solid state drive, hard disk drive, a magnetic disk drive, an optical disk drive, or the like.

The video adapter and the I/O interface provide interfaces to couple external input and output devices to the processing unit. As illustrated, examples of input and output devices include the display coupled to the video adapter and the mouse/keyboard/printer coupled to the I/O interface. Other devices may be coupled to the processing unit, and additional or fewer interface cards may be utilized. For example, a serial interface such as Universal Serial Bus (USB) (not shown) may be used to provide an interface for a printer.

The processing unit also includes one or more network interfaces, which may include wired links, such as an Ethernet cable or the like, and/or wireless links to access nodes or different networks. The network interface allows the processing unit to communicate with remote units via the networks. For example, the network interface may provide wireless communication via one or more transmitters/transmit antennas and one or more receivers/receive antennas. In an embodiment, the processing unit is coupled to a local-area network or a wide-area network for data processing and communications with remote devices, such as other processing units, the Internet, remote storage facilities, or the like.

Figure 11:
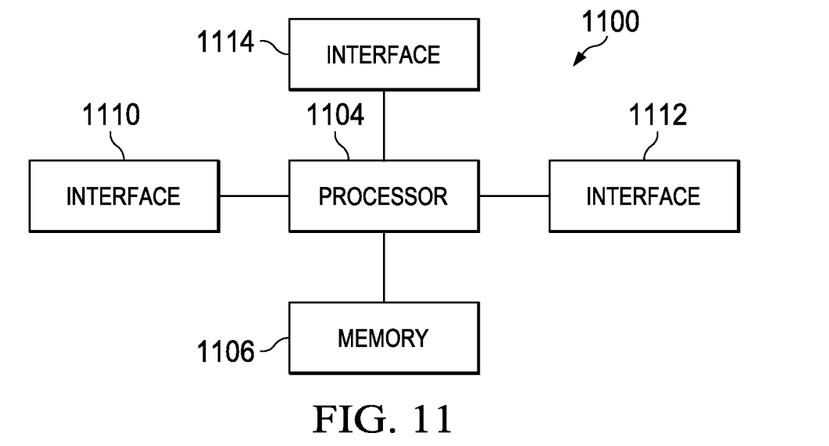
FIG. 11 illustrates a diagram of an embodiment communications device.

FIG. 11 illustrates a block diagram of an embodiment of a communications device 1100, which may be equivalent to one or more devices (e.g., UEs, NBs) discussed above. The communications device 1100 may include a processor 1104, a memory 1106, and a plurality of interfaces 1110, 1112, 1114, which may (or may not) be arranged as shown in FIG. 11. The processor 1104 may be any component capable of performing computations and/or other processing related tasks, and the memory 1106 may be any component capable of storing programming and/or instructions for the processor 1104. The interfaces 1110, 1112, 1114 may be any component or collection of components that allows the communications device 1100 to communicate using a wireless signal, and may be used to receive and/or transmit information over a wireless connection of a wireless network.

Although the description has been described in detail, it should be understood that various changes, substitutions and alterations can be made without departing from the spirit and scope of this disclosure as defined by the appended claims. The scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

The following references are related to subject matter of the present application. Each of these references is incorporated herein by reference in its entirety:

John Byers, Michael Luby, Michael Mitzenmacher, Ashu Rege, "A Digital Fountain Approach to Reliable Distribution of Bulk Data," Proceedings of ACM SIGCOMM '98, Sep. 2-4, 1998.

A Shokrollahi, "Raptor codes," Information Theory, IEEE Transactions on 52 (6), 2551-2567.

"LT Codes" Foundations of Computer Science, 2002. Proceedings. The 43rd Annual IEEE Symposium on, 271-280.

3GPP TS 26.346 V10.4.0, "Technical Specification Group Services and System Aspects: MBMS, Protocols and codecs," (Release 10), 2012.

M. Luby, M. Mitzenmacher, A. Shokrollahi, and D. Spielman, "Efficient erasure correcting codes," IEEE Trans. Inf. Theory, vol. 47, no. 2, pp. 569-584, Feb. 2001.

H. Kushwaha, Y. Xing, R. Chandramouli, and Harry Heffes, "Reliable Multimedia Transmission Over Cognitive Radio Networks Using Fountain Codes," Proceedings of the IEEE (Volume 96, Issue 1).

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for wireless transmission, the method comprising:
    encoding a traffic flow using a rate-less code to obtain rate-less-encoded packets; and
    simultaneously transmitting, by a transmit point, a first subset of the rate-less-encoded packets to a receive point over a licensed band of a unified air interface operating in accordance with a common cellular radio access technology (RAT), and a second subset of the rate-less-encoded packets to the receive point over an unlicensed band of the unified air interface operating in accordance with the common cellular RAT, the unified air interface providing a common physical and medium access control (MAC) connection between the receive point and the transmit point; and
    wherein the method further comprises:
    dynamically adjusting a rate in which the first subset of the rate-less-encoded packets are transmitted over the licensed band from a first transmission rate to a second transmission rate in accordance with a quality of service (QoS) metric of the unlicensed band.

2. The method of claim 1, wherein
    both the first transmission rate and the second transmission rate are non-zero transmission rates, and the first subset of the rate-less-encoded packets and the second subset of the rate-less-encoded packets are transmitted at different rates.

3. The method of claim 1, wherein dynamically adjusting the rate in which the first subset of the rate-less-encoded packets are transmitted over the licensed band from the first transmission rate to the second transmission rate in accordance with the QoS metric of the unlicensed band comprises:
    increasing the rate in which the first subset of the rate-less-encoded packets are transmitted over the licensed band, and decreasing a rate in which the second subset of the rate-less-encoded packets are transmitted over the unlicensed band, when a packet loss rate on the unlicensed band exceeds a threshold, an increase in the rate in which the first subset of the rate-less-encoded packets are transmitted over the licensed band at least partially compensating for a decrease in the rate in which the second subset of the rate-less-encoded packets are transmitted over the unlicensed band.

4. The method of claim 1, wherein dynamically adjusting the rate in which the first subset of the rate-less-encoded packets are transmitted over the licensed band from the first transmission rate to the second transmission rate in accordance with the QoS metric of the unlicensed band comprises:
    decreasing the rate in which the first subset of the rate-less-encoded packets are transmitted over the licensed band, and increasing a rate in which the second subset of the rate-less-encoded packets are transmitted over the unlicensed band, when a packet loss rate on the unlicensed band falls below a threshold, an increase in the rate in which the second subset of the rate-less-encoded packets are transmitted over the unlicensed band at least partially compensating for a decrease in the rate in which the first subset of the rate-less-encoded packets are transmitted over the licensed band.

5. The method of claim 4, wherein increase in the rate in which the second subset of the rate-less-encoded packets are transmitted over the unlicensed band is proportional to decrease in the rate in which the first subset of the rate-less-encoded packets are transmitted over the licensed band.

6. The method of claim 1, wherein dynamically adjusting the rate in which the first subset of the rate-less-encoded packets are transmitted over the licensed band from the first transmission rate to the second transmission rate in accordance with the QoS metric of the unlicensed band comprises:
  increasing the rate in which the first subset of the rate-less-encoded packets are transmitted over the licensed band, and decreasing a rate in which the second subset of the rate-less-encoded packets are transmitted over the unlicensed band, when a contention level or latency of the unlicensed band exceeds an upper threshold; and
  decreasing the rate in which the first subset of the rate-less-encoded packets are transmitted over the licensed band, and increasing the rate in which the second subset of the rate-less-encoded packets are transmitted over the unlicensed band, when the contention level or latency of the unlicensed band falls below a lower threshold.

7. The method of claim 1, further comprising:
  dynamically adjusting rates in which the rate-less-encoded packets are communicated over at least one of the licensed band and the unlicensed band in accordance with a characteristic of the traffic flow.

8. The method of claim 7, wherein dynamically adjusting the rates in which the rate-less-encoded packets are transmitted over at least one of the licensed band and the unlicensed band in accordance with the characteristic of the traffic flow comprises:
  determining rates for the licensed band and the unlicensed band in accordance with a QoS or a priority level of the traffic flow; and
  transmitting the first subset of the rate-less-encoded packets over the licensed band and the second subset of the rate-less-encoded packets over the unlicensed band in accordance with the determined rates.

9. The method of claim 1, wherein the rate-less code is applied at a physical layer.

10. The method of claim 1, wherein encoding the traffic flow using the rate-less code to obtain the rate-less-encoded packets comprises applying the rate-less code at a MAC layer.

11. The method of claim 1, wherein encoding the traffic flow using the rate-less code to obtain the rate-less-encoded packets comprises applying the rate-less code at a radio link control (RLC) layer.

12. The method of claim 1, encoding the traffic flow using the rate-less code to obtain the rate-less-encoded packets comprises applying the rate-less code at an application layer.

13. The method of claim 1, wherein automatic repeat request (ARQ) signaling is excluded from a radio link control (RLC) layer and a media access control (MAC) layer.

14. The method of claim 1, wherein transmitting the first subset of the rate-less-encoded packets over the licensed band and the second subset of the rate-less-encoded packets over the unlicensed band comprises:
  transmitting the first subset of the rate-less-encoded packets and the second subset of the rate-less-encoded packets directly to the receive point in accordance with a common telecommunication protocol.

15. The method of claim 2, wherein the QoS metric of the unlicensed band includes a packet loss rate, contention level, or latency of the unlicensed band.

16. The method of claim 1, wherein the first subset of the rate-less-encoded packets is transmitted at a rate that is based on a quality of service (QoS) of the unlicensed band.

17. A wireless multi-band transmitter comprising:
  a processor; and
  a non-transitory computer readable storage medium storing programming for execution by the processor, the programming including instructions to:
  encode a traffic flow using a rate-less code to obtain rate-less-encoded packets; and
  transmit a first subset of the rate-less-encoded packets to a receive point over a licensed band of a unified air interface operating in accordance with a common cellular radio access technology (RAT), and a second subset of the rate-less-encoded packets to the receive point over an unlicensed band of the unified air interface operating in accordance with the common cellular RAT, the unified air interface providing a common physical and medium access control (MAC) connection between the receive point and the wireless multi-band transmitter; and
  wherein the programming further includes instructions to:
  dynamically adjust a rate in which the first subset of the rate-less-encoded packets are transmitted over the licensed band from a first transmission rate to a second transmission rate in accordance with a quality of service (QoS) metric of the unlicensed band.

18. The wireless multi-band transmitter of claim 17, wherein
  both the first transmission rate and the second transmission rate are non-zero transmission rates, and the first subset of the rate-less-encoded packets and the second subset of the rate-less-encoded packets are transmitted at different rates.

19. The wireless multi-band transmitter of claim 18, wherein the QoS metric of the unlicensed band includes a packet loss rate, contention level, or latency of the unlicensed band.

20. A method for receiving wireless transmissions, the method comprising:
  receiving, by a receive point, a wireless transmission from a single transmit point carrying a first subset of rate-less-encoded packets of a single traffic flow over a licensed band of a unified air interface operating in accordance with a common cellular radio access technology (RAT), and a second subset of rate-less-encoded packets of the single traffic flow over an unlicensed band of the unified air interface operating in accordance with the common cellular RAT, the unified air interface providing a common physical and medium access control (MAC) connection between the receive point and the single transmit point; and
  jointly decoding both the first subset of rate-less-encoded packets received over the licensed band and the second subset of rate-less-encoded packets received over the unlicensed band in accordance with a same rate-less code to obtain the single traffic flow, the first subset of rate-less-encoded packets and the second subset of rate-less-encoded packets having been generated from the single traffic flow using the same rate-less code by the single transmit point, wherein a common physical or MAC layer processing entity of the receive point jointly decodes the first subset of rate-less-encoded packets received over the licensed band and the second subset of rate-less-encoded packets received over the unlicensed band in accordance with the same rate-less code; and
  wherein the first subset of rate-less-encoded packets is received at a rate that is dynamically adjustable based on a quality of service (QoS) of the unlicensed band.

21. The method of claim 20, wherein the first subset of the rate-less-encoded packets is and the second subset of rate-less-encoded packets are received at different rates.

22. A wireless multi-band receiver comprising:
- a processor; and
- a non-transitory computer readable storage medium storing programming for execution by the processor, the programming including instructions to:
- receive a wireless transmission carrying a first subset of rate-less-encoded packets of a single traffic flow over a licensed band of a unified air interface operating in accordance with a common cellular radio access technology (RAT), and a second subset of rate-less-encoded packets of the single traffic flow over a unlicensed band of the unified air interface operating in accordance with the common cellular RAT, the unified air interface providing a common physical and medium access control (MAC) connection between the wireless multi-band receiver and a single transmit point; and
- jointly decode both the first subset of rate-less-encoded packets received over the licensed band and the second subset of rate-less-encoded packets received over the unlicensed band in accordance with a same rate-less code to obtain the single traffic flow, the first subset of rate-less-encoded packets and the second subset of rate-less-encoded packets having been generated from the single traffic flow using the same rate-less code by the single transmit point, wherein a common physical or MAC layer processing entity of the wireless multi-band receiver jointly decodes the first subset of rate-less-encoded packets received over the licensed band and the second subset of rate-less-encoded packets received over the unlicensed band in accordance with the same rate-less code; and
- wherein the first subset of rate-less-encoded packets is received at a rate that is dynamically adjustable based on a quality of service (QoS) metric of the unlicensed band.

* * * * *